Feb. 11, 1964  J. W. ROWLAND  3,121,039
CURING APPARATUS
Filed Jan. 26, 1959  4 Sheets-Sheet 3
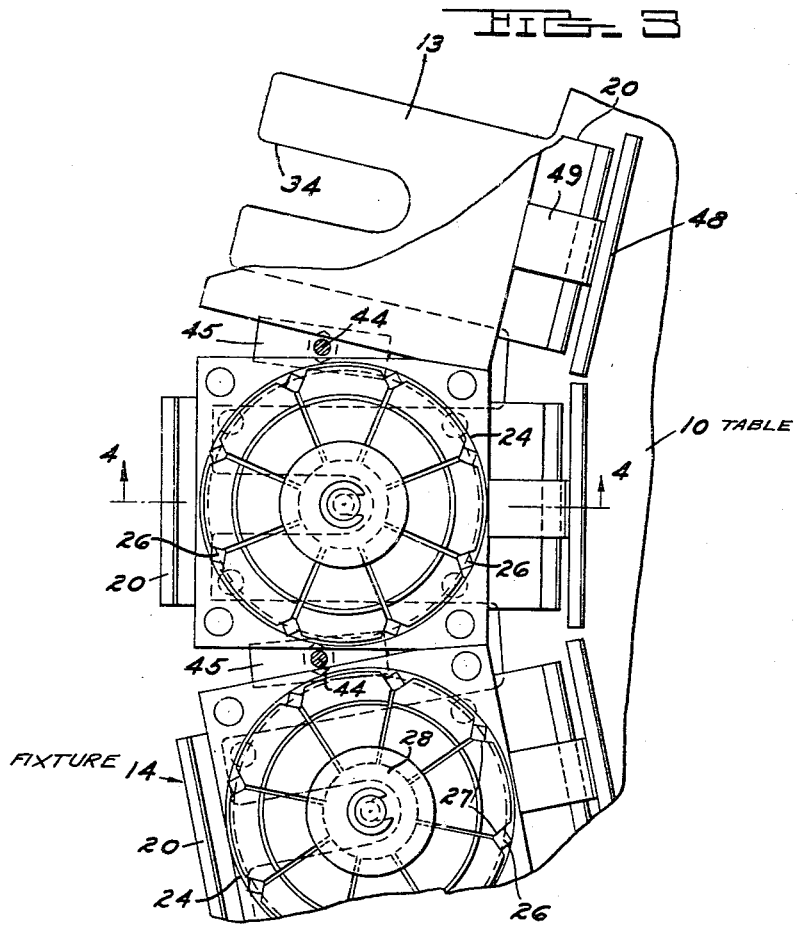
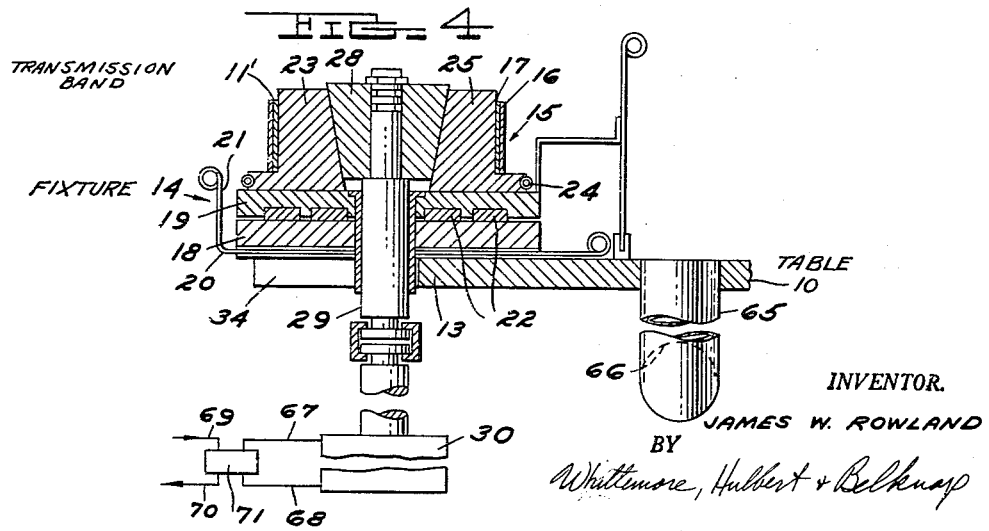
INVENTOR.
JAMES W. ROWLAND
BY
Whittemore, Hulbert & Belknap
ATTORNEYS

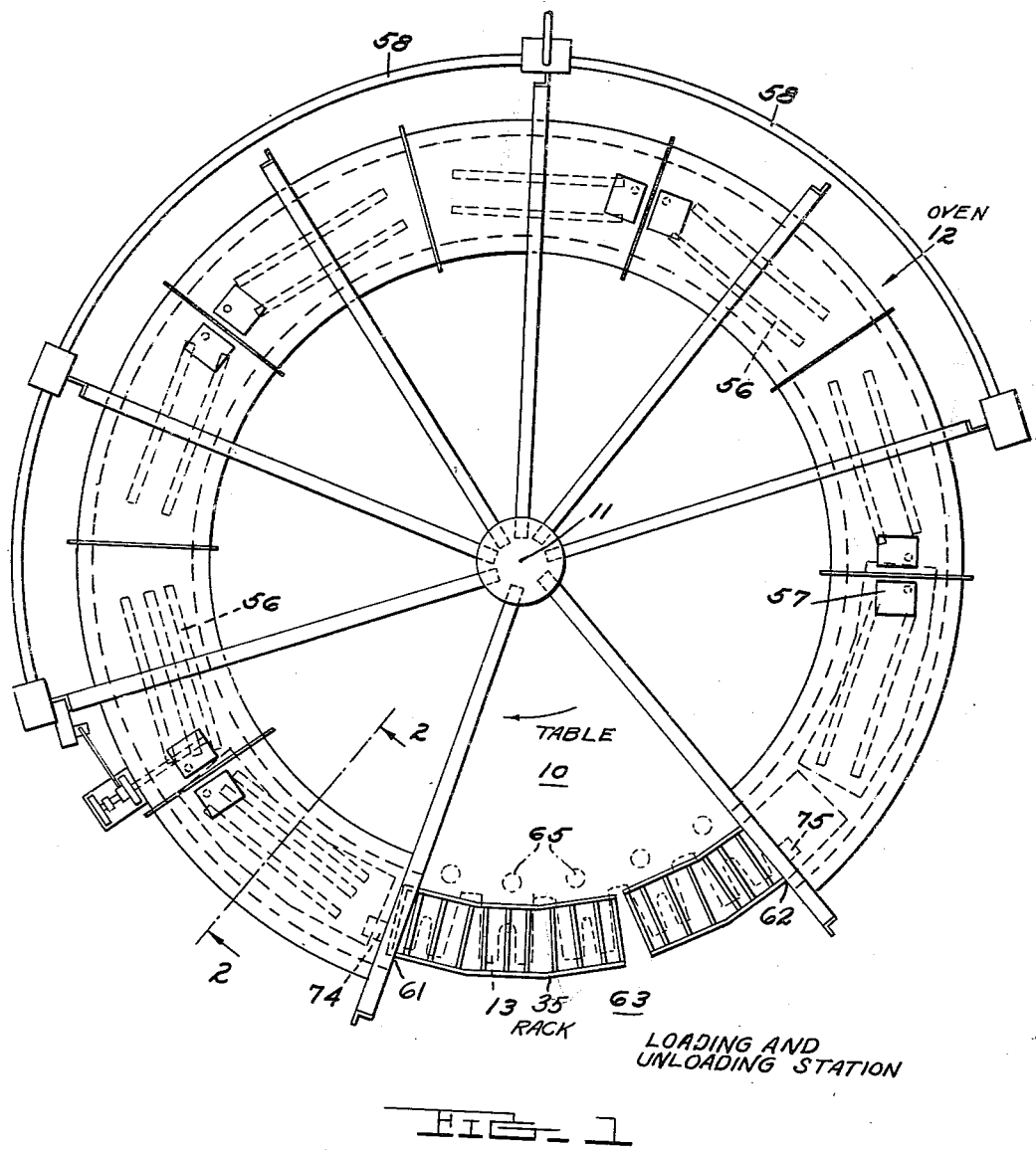

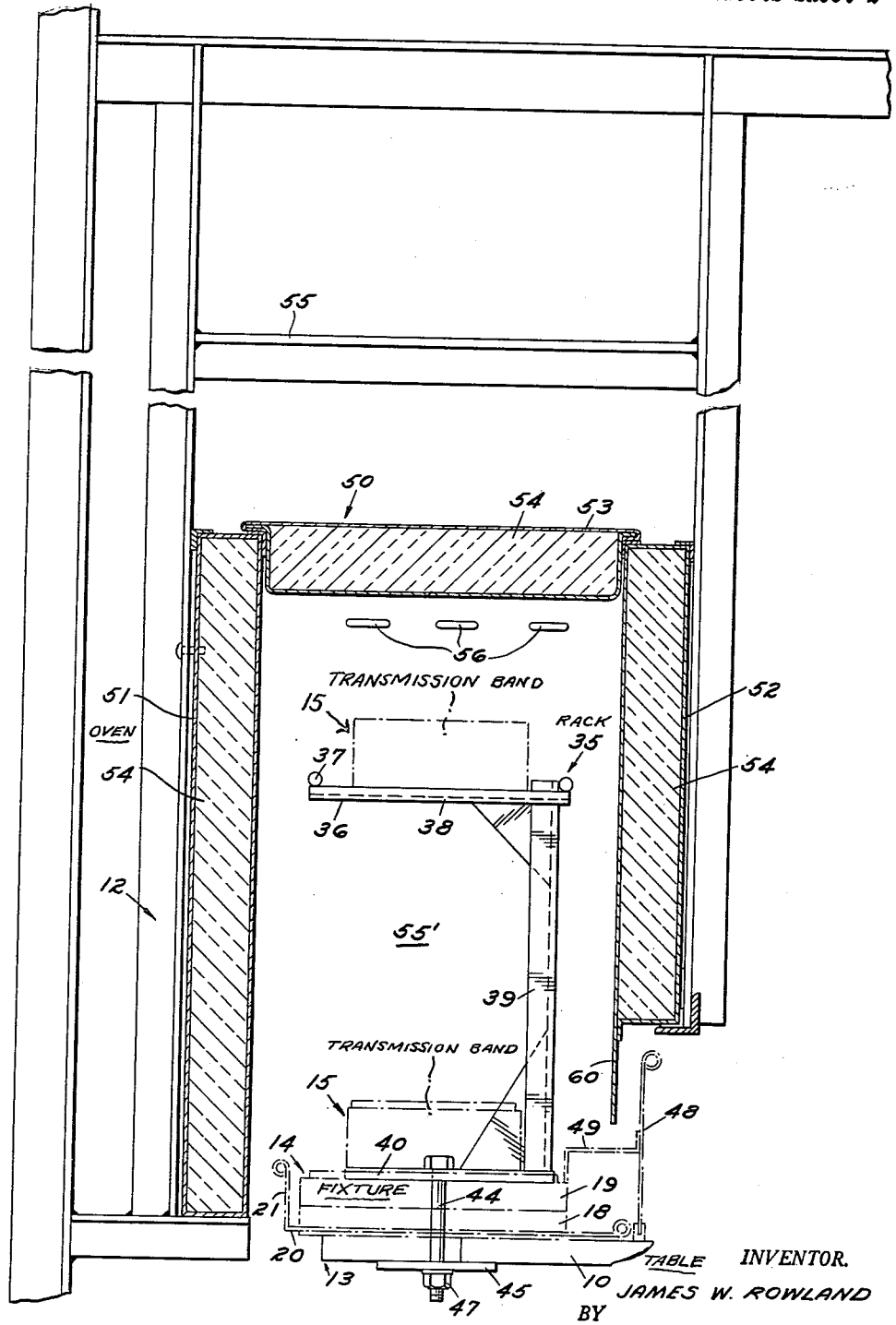

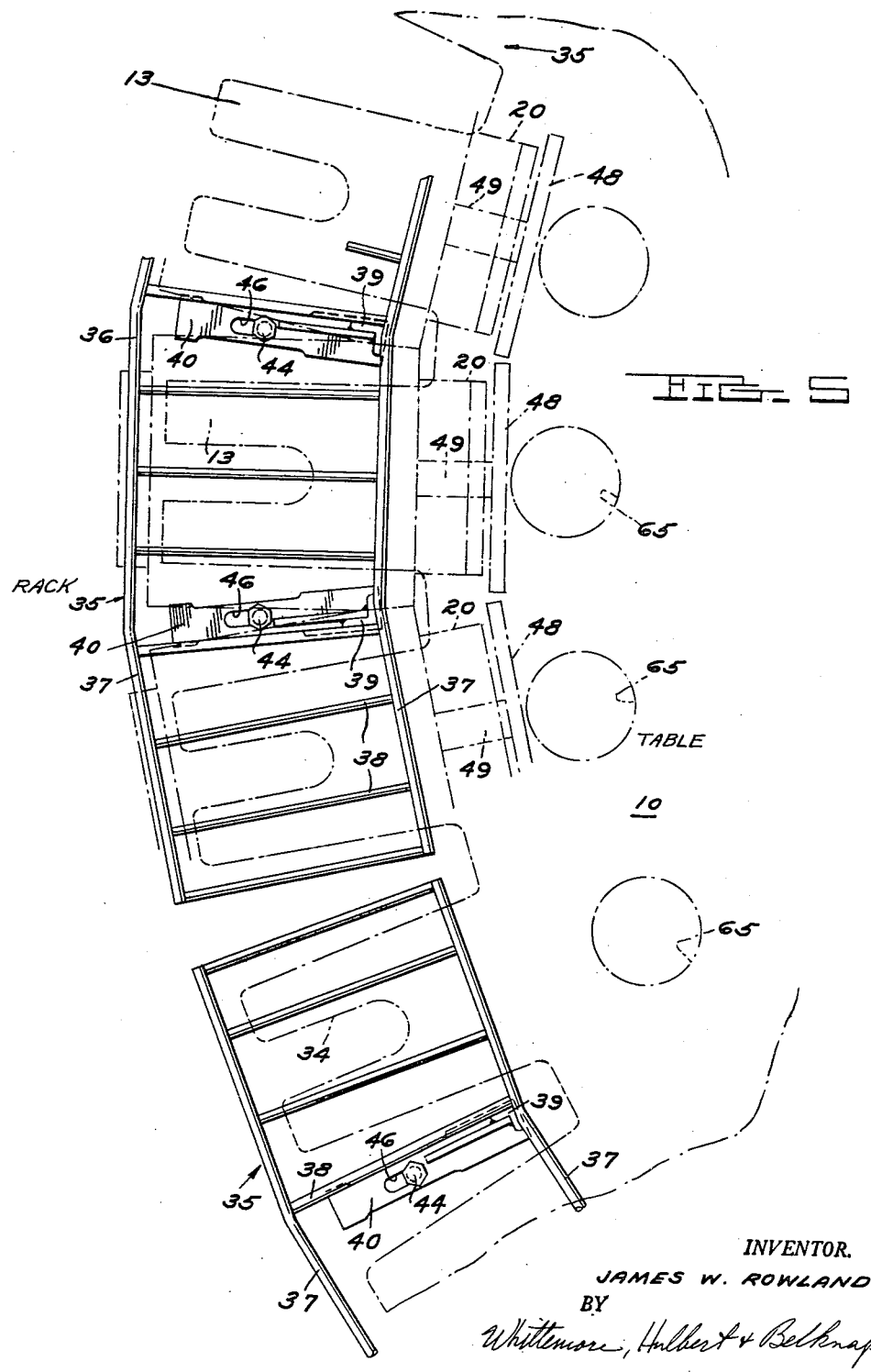

3,121,039
CURING APPARATUS

James W. Rowland, Jackson County, Mich., assignor to Kelsey-Hayes Company, Detroit, Mich., a corporation of Delaware
Filed Jan. 26, 1959, Ser. No. 788,929
8 Claims. (Cl. 156—381)

This invention relates to a curing method and apparatus and refers more particularly to a method and apparatus for curing an adhesive bond between the parts of transmission bands of the type employed in the conventional automatic transmissions of automobiles.

The invention has for one of its objects to provide a curing method and apparatus which will expedite production.

The invention has for another object to provide apparatus including a post heat oven for curing the adhesive bond between the parts of transmission bands which will enable substantially increased production without materially increasing cost or requiring added space to carry out the operation.

Other objects and features of the invention will become apparent as the description proceeds, especially when taken in conjunction with the accompanying drawings, illustrating a preferred embodiment of the invention, wherein:

FIG. 1 is a plan view of apparatus embodying the invention;

FIG. 2 is a sectional view taken on the line 2—2 of FIG. 1;

FIG. 3 is a fragmentary plan view of the work table with the band racks removed to better illustrate the work-supporting fixtures on the table;

FIG. 4 is a sectional view on the line 4—4 of FIG. 3; and

FIG. 5 is a fragmentary plan view similar to FIG. 3 with the work table shown in phantom lines and the band racks in position thereon in solid lines.

Referring now more particularly to the drawings, the apparatus there illustrated comprises a work carrier in the form of a circular table 10 supported for rotation in the direction of the arrow in FIGURE 1 about a vertical axis 11, and a post heat oven 12 associated with the work table.

The work table has a generally circular periphery formed to provide the equally spaced radially outwardly extending supports 13 which are integral with the table. Each support mounts a fixture 14 thereon which is adapted to hold an annular transmission band 15 during a portion of the curing operation. The transmission band comprises an annular band or backing member 16 and a liner 17 of friction material on its inner surface. Interposed between the backing member and liner is a film of a thermosetting plastic adhesive 11, preferably one known as Cycleweld cement, for the purpose of bonding the liner to the backing member when fully cured.

Each fixture comprises a pair of base plates 18 and 19 mounted one upon the other on the associated table support 13. A shield 20 is sandwiched between the base 18 and the table support and has an upturned radially outer terminal portion 21. The shield is provided to prevent unnecessary loss of heat from the heating chamber or oven 12. Curing heat is generated by the electric heaters 22 carried by each fixture between the base plates thereof. Mounted on the upper base plate of each fixture are a series of clamping jaws 23 which are arranged in a circle and are normally urged radially inwardly by a garter spring 24 which encircles the series of jaws and is located in aligned recesses around the outer periphery of the lower projecting portions thereof. The upper portions 25 of the jaws are arcuate and extend vertically and together define a cylindrical form for supporting a transmission band. Diamond shaped separators 26 are wedged between adjacent clamping jaws and engage inclined surfaces 27 of the jaws to maintain them in uniformly spaced relation to each other, and the garter spring bears against the outer edges of the separators to urge them inwardly and hold them in tight engagement with the inclined surfaces.

The jaws 23 are moved radially outwardly against the resistance of spring 24 by a cone-shaped actuator 28 located within the circle of jaws and secured to the upper end of the plunger 29 which is carried by the piston of a double acting air cylinder 30. When the actuator is pulled downwardly by the air cylinder the jaws are cammed radially outwardly to expand the transmission band 15 and place the thermosetting adhesive under pressure, and when the actuator is raised by reversal of the air cylinder the jaws are contracted by the spring 24 to release the band. The supports 13 are slotted at 34 to accommodate the plunger 29 and facilitate assembly of the fixtures and plungers on the table.

Band racks 35 are carried by the work table in a circular series around the periphery of the table in association with the fixture supports, with one rack provided for three supports. As shown particularly in FIGS. 1, 2 and 5, each rack comprises a tray 36 formed by the elongated laterally spaced bars 37 connected by transverse bars 38. The trays 36 are supported above the fixture supports by vertical posts 39 secured to and depending from the trays and having mounting plates 40 at their lower ends supported upon the upper base plates of adjacent fixtures. As seen particularly in FIG. 2, the base plates 18 and 19 of adjacent fixtures diverge radially outwardly to provide a space therebetween to accommodate a mounting bolt 44 extending between the mounting plate and a clamping plate 45 bearing against the underside of the supports. The mounting plates of the racks have elongated slots 46 which receive the bolts and permit adjustment of the racks radially. The bolts have enlarged heads at their upper ends bearing down on the mounting plates and nuts 47 threaded on the lower ends of the bolts bear up against the clamping plates to provide a secure mounting for the racks.

Each fixture has a second shield 48 secured to and extending vertically upwardly from the table 10, and braced by a bracket 49. The shields 48 also tend to reduce heat loss from the oven chamber.

Suitable means not shown are provided for rotating the table 10 clockwise as shown by the arrow in FIG. 1.

The post heat oven 12 comprises a circular casing 50 formed of hollow side walls 51 and 52 and a hollow top wall 53. Heat insulating material 54 is disposed within the hollow walls of the casing. The casing is supported by a suitable frame 55 and within the heating chamber 55′ defined by the casing, in the upper part thereof are heating elements 56. The heating elements 56 are heated by wiring from the terminal boxes 57, the wiring being carried by conduits 58.

The circular oven is concentric with the fixture circle and of the same radius. The bottom of the casing is open and the fixtures extend into the heating chamber 55′ of the oven through the open bottom thereof, as seen in FIG. 2. The radially outer wall 51 of the casing cooperates with the shield 20 in opposing the loss of heat from the chamber, and the depending extension 60 of the inner wall 52 cooperates with the shield 48 for the same purpose.

The oven 12 extends continuously from the entrance 61 to the exit 62 thereof. Hence the oven is not a full circle, and the open space between the entrance 61 and exit 62 provides a loading and unloading station 63.

The conduits 65 extend through holes in the table and provide for a circulation of air from beneath the table to the area above. The conduits have bottom openings 66 which are inclined to the horizontal and face downwardly and in the direction of table rotation to pick up air.

Each air cylinder has air lines 67 and 68 leading to opposite ends thereof, and these lines are alternately connected to air pressure and exhaust lines 69 and 70 by a four-way valve 71.

In use, the work table is rotated at a speed of approximately one revolution in four minutes and the heaters 22 and 56 maintain a substantially uniform temperature within the heating chamber of 400°–450° F. both in the upper portion thereof adjacent the trays 36 and in the lower portion adjacent the fixtures. As the table rotates, an operator positioned at the loading and unloading station 63 will load onto each fixture a transmission band assembly comprising the backing member or band 16, the liner 17 and an interposed film of uncured thermosetting adhesive, preferably Cycleweld cement. After loading the uncured transmission band on a fixture, the air cylinder 30 associated with that fixture is operated by its valve 71 to pull the actuator 28 down and expand the transmission band to place the uncured adhesive under a pressure of approximately 200 p.s.i. The operation of the air cylinders may be accomplished in any suitable way and may for example be performed by a device 74 positioned at the entrance of the oven for mechanically operating the valve. The air cylinder is reversed to release the expanding pressure on the transmission band in any suitable way and preferably by a device 75 at the exit end 62 of the oven for mechanically operating the valve. Of course, the valves of the successive air cylinders may be manually operated.

Transmission bands that have completed a cycle through the oven chamber on the fixtures are removed from the fixtures at the station 63 by the operator. The transmission bands thus removed have been in the oven at the proper temperature and for a sufficient period of time to partially cure the adhesive. The removed and partially cured bands are transferred from a fixture to the tray directly above and will be transported through the oven chamber for a second cycle. During the second cycle the adhesive is not under any pressure. It has been found that after the adhesive is partially cured under pressure, the remainder of the cure may be accomplished by heat alone in the second cycle. As the transmission bands complete a second cycle through the oven on the racks 35, they are removed at the station 63 and have at this stage reached a condition of full and complete cure. A single operator may handle the loading, unloading and transfer of bands at the station 63. He will first remove a fully cured band from the rack, then transfer a partially cured band from the fixture below to the now vacant rack above and thereafter load a fresh transmission band with uncured adhesive on the now vacant fixture.

As a result of the foregoing, transmission bands are fully cured at the rate of 30 every four minutes, there being 30 fixtures on the work table which rotates one revolution every four minutes. Prior to this invention, the work table herein described was employed without the racks 36 and without the oven. The transmission bands were cured in one cycle, being supported under pressure on the fixtures during the cycle. They were heated to the same temperature by heaters 22 alone. A curing time of approximately seven minutes was required to complete the cure. In the production of transmission bands, the curing has been a bottleneck and hence some means had to be devised for increasing the output of the curing apparatus. In order to increase production, the provision of a second curing table was considered. However this would have required a very large capital expenditure and additional floor space. By simply adding an oven and racks, production has been increased from 30 bands every seven minutes to 30 bands in only four minutes. The increased production is accomplished without any increase in required floor space, and at relatively small cost.

What I claim as my invention is:

1. In apparatus for use in the manufacture of composite members each having an adhesive, means providing a curing zone, a carrier movable through said curing zone, first work support means on said carrier for supporting members having uncured adhesive, second work support means on said carrier spaced above said first support means for supporting members transferred from said first support means and having partially cured adhesive, means for heating the members on said first and second support means during the movement thereof through said curing zone to promote curing of the adhesive, and means for applying pressure to the adhesive of the members on said first support means during movement thereof through said curing zone to further promote curing of the adhesive.

2. In apparatus for use in the manufacture of friction members each comprising a backing, a friction face and an intermediate adhesive, means providing a curing zone, a carrier movable through said curing zone, a first series of work supports on said carrier for supporting friction members having uncured adhesive, a second series of work supports on said carrier spaced above said first series of work supports for supporting friction members transferred from said first series of work supports and having partially cured adhesive, means for heating the members on the first and second series of work supports during movement thereof through said curing zone to promote curing of the adhesive, and means for applying pressure to the adhesive of the members on said first series of supports during movement thereof through said curing zone to further promote curing of the adhesive.

3. In apparatus for use in the manufacture of friction members each comprising a band, an internal friction face for the band and an intermediate thermo-setting adhesive, means providing a curing zone, a carrier movable through said curing zone, a series of fixtures on said carrier for supporting friction members having uncured adhesive, shelves on said carrier spaced above said fixtures for supporting friction members transferred from said fixtures and having partially cured adhesive, means for heating the members on said fixtures and shelves during the movement thereof through said curing zone to promote curing of the adhesive, and means for applying pressure to the adhesive of the members on said fixtures during movement thereof through said curing zone to further promote curing of the adhesive.

4. In apparatus for use in the manufacture of friction members each comprising a backing, a friction face and an intermediate thermosetting adhesive, means providing a curing zone, a rotatable carrier having a first series of work supports arranged annularly about the axis of rotation of said carrier for movement through said curing zone as said carrier rotates, said work supports being adapted to support friction members having uncured adhesive, said carrier also having a second series of work supports spaced above said first series of work supports and arranged annularly about the axis of rotation of said carrier for movement through said curing zone as said carrier rotates, said second series of work supports being adapted to support friction members transferred from said first series of work supports and having partially cured adhesive, means for heating the members on said first and second series of work supports during the movement thereof through said curing zone to promote curing of the adhesive, and means for applying pressure to the adhesive of the members on said first series of work supports during movement thereof through said curing zone to further promote curing of the adhesive.

5. In apparatus for use in the manufacture of friction members each comprising an endless band, an internal friction face for the band and an intermediate thermosetting adhesive, means providing a curing zone, a rotatable carrier having a series of fixtures arranged annularly about the axis of rotation of said carrier for movement through said curing zone as said carrier rotates, said fixtures being adapted to support friction members having uncured adhesive, said carrier also having shelving spaced above said fixtures arranged annularly about the axis of rotation of said carrier for movement through said curing zone as said carrier rotates, said shelving being adapted to support friction members transferred from said fixtures and having partially cured adhesive, means for heating the members on said fixtures and shelving during the movement thereof through said curing zone to promote curing of the adhesive, and means for applying pressure to the adhesive of the members on said fixtures during movement thereof through said curing zone to further promote curing of the adhesive.

6. The apparatus defined in claim 5 having means for preventing undue loss of heat during the curing operation including a shield extending upwardly from each fixture, and a fixed depending annular shield vertically overlapping said first-mentioned shields during rotation of said carrier.

7. The apparatus defined in claim 5, wherein said carrier is provided with means enabling a circulation of air from beneath the carrier to the area above including conduits extending through said carrier having bottom openings beneath said carrier which are inclined to the horizontal and face downwardly in the direction of carrier rotation to pick up air.

8. The apparatus defined in claim 5, wherein said shelving is in the form of open grid work.

References Cited in the file of this patent
UNITED STATES PATENTS

| | | |
|---|---|---|
| 1,278,200 | Osborne | Sept. 10, 1918 |
| 1,312,833 | Colias | Aug. 12, 1919 |
| 2,222,514 | O'Brien et al. | Nov. 19, 1940 |
| 2,490,819 | Zambert et al. | Dec. 13, 1949 |
| 2,494,281 | Batchelor et al. | Jan. 10, 1950 |
| 2,499,926 | Lloyd | Mar. 7, 1950 |
| 2,525,407 | Frei | Oct. 10, 1950 |
| 2,556,709 | Schultz | June 12, 1951 |
| 2,655,974 | Heintz | Oct. 20, 1953 |
| 2,742,386 | Bigelow | Apr. 17, 1956 |
| 2,787,814 | Milligan | Apr. 9, 1957 |